(12) United States Patent
Zhu et al.

(10) Patent No.: US 12,111,031 B2
(45) Date of Patent: Oct. 8, 2024

(54) CONDENSER, AND HIGH-AND-LOW-BEAM INTEGRATED VEHICLE LAMP MODULE

(71) Applicant: HASCO VISION TECHNOLOGY CO., LTD., Shanghai (CN)

(72) Inventors: He Zhu, Shanghai (CN); Cong Li, Shanghai (CN); Zhiping Qiu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/924,556

(22) PCT Filed: Feb. 26, 2021

(86) PCT No.: PCT/CN2021/078216
§ 371 (c)(1),
(2) Date: Nov. 10, 2022

(87) PCT Pub. No.: WO2021/238314
PCT Pub. Date: Dec. 2, 2021

(65) Prior Publication Data
US 2023/0142357 A1    May 11, 2023

(30) Foreign Application Priority Data
May 29, 2020    (CN) .......................... 202020958350.X

(51) Int. Cl.
*F21S 41/20*    (2018.01)
*F21S 41/24*    (2018.01)
(Continued)

(52) U.S. Cl.
CPC ............. *F21S 41/285* (2018.01); *F21S 41/24* (2018.01); *F21S 41/322* (2018.01); *F21S 41/43* (2018.01);
(Continued)

(58) Field of Classification Search
CPC ........... F21S 41/24; F21S 41/40; F21S 41/43; F21W 2102/10; F21W 2102/13;
(Continued)

(56) References Cited

U.S. PATENT DOCUMENTS

2018/0272925 A1*   9/2018   Wang .................. B60Q 1/10
2021/0231281 A1*   7/2021   Knaack ................ F21S 41/663

FOREIGN PATENT DOCUMENTS

| CN | 106122870 | 11/2016 |
| CN | 206268977 | 6/2017 |

(Continued)

OTHER PUBLICATIONS

International Search Report, International Patent Application No. PCT/CN2021/078216, mailed Jun. 2, 2021, 6 pages.
(Continued)

*Primary Examiner* — Colin J Cattanach
(74) *Attorney, Agent, or Firm* — Casimir Jones, S.C.; Robert A. Goetz

(57) ABSTRACT

Disclosed is a condenser and a high-and-low-beam integrated vehicle lamp module, the condenser comprises at least one light incident portion, a light-transmitting portion, and a light emergent portion, wherein a 50L dark area light shape forming structure is formed on the light-transmitting portion; the 50L dark area light shape forming structure protrudes from a surface of the light-transmitting portion and has a slope surface; and the distance from the slope surface to the surface of the light-transmitting portion gradually increases from a position close to the light incident portion to the light emergent portion. Since the 50L dark area light shape forming structure protrudes out of the surface of the light-transmitting portion and has the slope
(Continued)

surface, in a high-beam illumination mode, some light is emitted from the 50L dark area light shape forming structure to a 50L test point.

5 Claims, 8 Drawing Sheets

(51) Int. Cl.
| | |
|---|---|
| *F21S 41/32* | (2018.01) |
| *F21S 41/40* | (2018.01) |
| *F21S 41/43* | (2018.01) |
| *F21W 102/10* | (2018.01) |
| *F21W 102/13* | (2018.01) |
| *F21W 102/135* | (2018.01) |
| *F21W 102/15* | (2018.01) |
| *F21W 102/155* | (2018.01) |
| *F21W 102/16* | (2018.01) |
| *F21W 102/165* | (2018.01) |
| *F21W 102/17* | (2018.01) |
| *F21W 102/18* | (2018.01) |
| *F21W 102/19* | (2018.01) |
| *F21W 102/20* | (2018.01) |
| *F21W 107/10* | (2018.01) |
| *G02B 19/00* | (2006.01) |

(52) U.S. Cl.
CPC ..... *G02B 19/0009* (2013.01); *G02B 19/0047* (2013.01); *F21S 41/40* (2018.01); *F21W 2102/10* (2018.01); *F21W 2102/13* (2018.01); *F21W 2102/135* (2018.01); *F21W 2102/15* (2018.01); *F21W 2102/155* (2018.01); *F21W 2102/16* (2018.01); *F21W 2102/165* (2018.01); *F21W 2102/17* (2018.01); *F21W 2102/18* (2018.01); *F21W 2102/19* (2018.01); *F21W 2102/20* (2018.01); *F21W 2107/10* (2018.01)

(58) Field of Classification Search
CPC ......... F21W 2102/135; F21W 2102/15; F21W 2102/155; F21W 2102/16; F21W 2102/165; F21W 2102/17; F21W 2102/18; F21W 2102/19; F21W 2102/20
See application file for complete search history.

(56) References Cited

FOREIGN PATENT DOCUMENTS

| | | |
|---|---|---|
| CN | 107191860 | 9/2017 |
| CN | 206592963 | 10/2017 |
| CN | 210069725 | 2/2020 |
| CN | 211875907 | 11/2020 |
| DE | 10 2018 125 157 | 4/2020 |
| JP | 2020-057616 | 4/2020 |
| WO | 2020/074327 | 4/2020 |

OTHER PUBLICATIONS

Office Action and Supplementary Search Report, EP Patent Application No. 21814174.5, dated Jun. 14, 2023, 8 bages.
International Search Report & Written Opinion, International Patent Application No. PCT/CN2021/078216, dated Jun. 1, 2021, 6 pages.
Office Action, JP Patent Application No. 2022-563340, dated Oct. 26, 2023, 5 pages.
Decision to Grant, JP Patent Application No. 2022-563340, dated Feb. 6, 2024, 2 pages.

* cited by examiner part A part B

C-C

CONDENSER, AND HIGH-AND-LOW-BEAM INTEGRATED VEHICLE LAMP MODULE

CROSS-REFERENCE TO RELATED APPLICATIONS

The present disclosure claims the benefit of Chinese patent application No. 202020958350.X filed on May 29, 2020, the contents of which are incorporated herein by reference.

TECHNICAL FIELD

The present disclosure relates to a vehicle lamp, and particularly to a condenser. In addition, the present disclosure further relates to a high-and-low-beam integrated vehicle lamp module containing this condenser.

BACKGROUND ART

In the vehicle lamp industry, many requirements for test points or zones are posed by low beam and high beam, and the light shape distributions of low beam and high beam should meet relevant standards, e.g., the Chinese standard "GB 25991-2010 Automotive headlamps with LED light sources and/or LED modules" and the like. FIG. 13 is a schematic diagram of requirements in GB25991 for test points or zones of low beam light shape. FIG. 14 is a low beam light shape with partial test points marked out, wherein for a 50L test point, the coordinate position of the point is (−3.4°, −0.9°), and it is required that the illuminance of this test point is not higher than a certain value, and taking GB25991 as an example, this value should not be higher than 15 lx.

In the prior art, taking the Chinese patent for invention with the number 201610679896.X, the application date on Aug. 17, 2016, and the authorization announcement date on Oct. 26, 2018 as an example, in order to control the illuminance value of the 50L test point to be below a certain value, the technical solution adopted is shown in FIGS. 15 and 16. The condenser comprises at least one high beam condensing structure 1-1, a III-zone light shape forming structure 1-2, and a cut-off line forming structure 1-3. The III-zone light shape forming structure 1-2 includes a III-zone light shape spreading width forming structure 1-2-1, a III-zone light shape brightness reducing structure 1-2-2, and a 50L dark area forming structure 1-2-3. The 50L dark area forming structure 1-2-3 is provided at the front end of the upper surface of the condenser and protrudes in a triangular shape perpendicular to the direction of light propagation, so as to reduce the illuminance value at the 50L test point. In a low beam illumination mode, light of the low beam propagates above the condenser, and the light shape thereof is shown in FIG. 17. The original propagation direction of the low beam light is changed under the action of the 50L dark area forming structure 1-2-3, such that light irradiating at the 50L test point G is reduced, causing that the illuminance value at the 50L test point G drops to a certain value (15 lx). In this light shape, the 50L test point G is close to a low beam cut-off line H. In a high beam illumination mode, high beam light propagates in the inside of the condenser, and the light shape thereof is shown in FIG. 18. The light of the high beam does not reach the 50L dark area forming structure 1-2-3 and emerge from the 50L dark area forming structure 1-2-3 to irradiate to the 50L test point G, such that in the high beam illumination mode, few light irradiates to the 50L test point G, causing that the isophotes at the 50L test point G do not have uniform transition, and dark spots are generated.

SUMMARY

A problem to be solved by an aspect of the present disclosure is to provide a condenser, which can make transition of isophotes at a 50L test point uniform, and accordingly would not cause the generation of dark spots in a high beam illumination mode and make high beam light shape uniform.

A problem to be solved by another aspect of the present disclosure is to provide a high-and-low-beam integrated vehicle lamp module, the condenser of which can make transition of isophotes at a 50L test point uniform, and accordingly would not cause the generation of dark spots in a high beam illumination mode and make high beam light shape uniform.

In order to achieve the above objects, an aspect of the present disclosure provides a condenser, comprising: at least one light incident portion, a light passage portion (light-transmitting portion), and a light emergent portion, wherein a 50L dark area light shape forming structure is formed on the light passage portion; the 50L dark area light shape forming structure protrudes from a surface of the light passage portion and has a slope surface; and the distance from the slope surface to the surface of the light passage portion gradually increases from a position close to the light incident portion to a position close to the light emergent portion.

Specifically, the slope surface is a flat surface or a smooth curved surface.

Preferably, an edge of the light emergent portion forms a cut-off line forming structure, and an edge line of the light emergent surface of the 50L dark area light shape forming structure is in connection with an edge line of the cut-off line forming structure.

Further preferably, the light emergent surface of the 50L dark area light shape forming structure is coplanar with the light emergent portion.

Preferably, an edge of the light emergent portion forms a cut-off line forming structure, and the 50L dark area light shape forming structure is provided on the side of the cut-off line forming structure close to the light incident portion.

Preferably, the slope surface and the surface of the light passage portion where the slope surface is located form an included angle $\alpha$, wherein $0° < \alpha \leq 30°$.

Further preferably, wherein $0° < \alpha \leq 10°$.

A technical solution to be solved by another aspect of the present disclosure is to provide a high-and-low-beam integrated vehicle lamp module, which comprises a condenser as described above.

Through the above technical solutions, the present disclosure achieves following beneficial effects:

1. In the present disclosure, the 50L dark area light shape forming structure is made to protrude from the surface of the light passage portion and have the slope surface. In the high beam illumination mode, most light emitted by a high beam light source firstly is converged by the light incident portion, then is transmitted via the light passage portion to the light emergent portion, and emerge from the light emergent portion to form a high beam light shape, while the other small part of light is converged by the light incident portion and then transmitted via the light passage portion to the 50L dark area light shape forming structure, and emerge from the light emergent surface of the 50L dark area light shape forming structure to the 50L test point, such that the light reaching the 50L test point is increased, the isophotes here have uniform transition, no dark spots would be generated, and the uniformity of the high beam light shape is improved.

2. In a preferred solution of the present disclosure, the slope surface and the surface of the light passage portion where the slope surface is located form an included angle ranging from 0 to 30°, that is to say, the entire structure of the 50L dark area light shape forming structure is relatively gentle with respect to the surface of the light passage portion and is not abrupt, such that in the high beam illumination mode, the light emitted by the high beam light source can irradiate the inside of the 50L dark area light shape forming structure and finally be projected to the 50L test point G, and the illuminance at the 50L test point G is the same as or similar to the high beam light shape illuminance.

3. In a preferred solution of the present disclosure, the 50L dark area light shape forming structure is coplanar with the light emergent portion, which, while ensuring that no dark spots would be generated at the 50L test point, can further achieve a significant illuminance reduction at the 50L test point in a low beam mode, such that emergent light accordingly do not cause a dazzling effect under the premise of a sufficient illumination intensity, so as to avoid affecting normal driving behavior of drives of oncoming vehicles.

DESCRIPTION OF REFERENCE SIGNS

Figure 1:
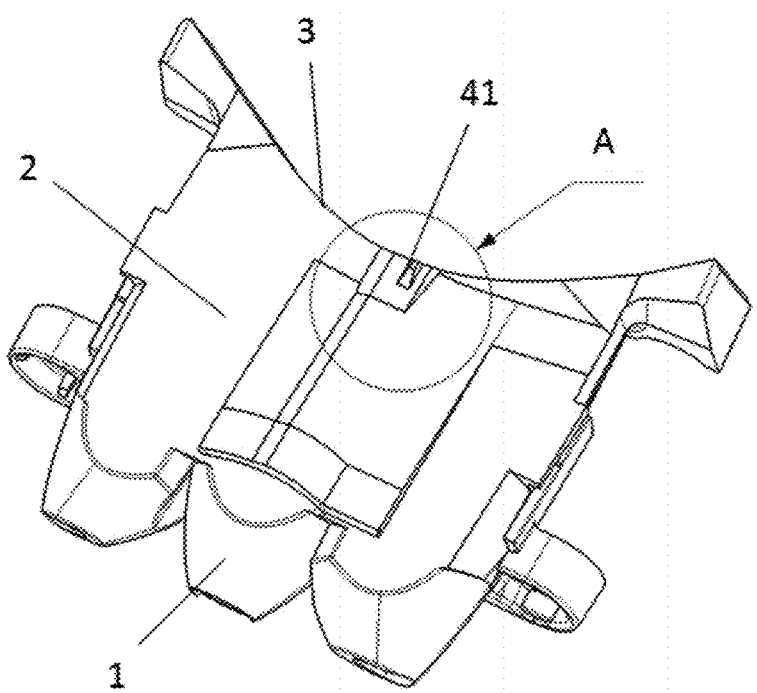
FIG. 1 is a first structural schematic diagram of a first embodiment of the present disclosure.

1: light incident portion
2: light passage portion
3: light emergent portion
31: cut-off line forming structure
41: 50L dark area light shape forming structure
411: slope surface
412: light emergent surface
5: light source
G: 50L test point
H: low beam cut-off line
1-1: high beam condensing structure
1-2: Ill-zone light shape forming structure
1-3: cut-off line forming structure
1-2-1: Ill-zone light shape spreading width forming structure
1-2-2: Ill-zone light shape brightness reducing structure
1-2-3: 50L dark area forming structure

DETAILED DESCRIPTION OF EMBODIMENTS

The specific embodiments of the present disclosure will be described in detail below with reference to the accompanying drawings. It should be understood that specific embodiments described here are merely used to illustrate and explain the present disclosure, instead of being intended to limit the present disclosure.

First of all, it shall be clarified that in the following description, some orientation terms involved for clearly illustrating the technical solution of the present disclosure, such as "front" and "rear", refer to the meanings analogized according to the orientation pointed by a normal vehicle after mounting the high-and-low-beam integrated vehicle lamp module in the vehicle, that is to say, the direction of the vehicle front indicates just the front, while the direction of the vehicle rear indicates the rear, and the orientation terms are intended merely to facilitate the description of the present disclosure and to simplify the description, rather than indicating or implying that the device or element referred to must have a specific orientation and be constructed and operated in a certain orientation, and therefore cannot be construed as limiting the present disclosure.

Figure 8:
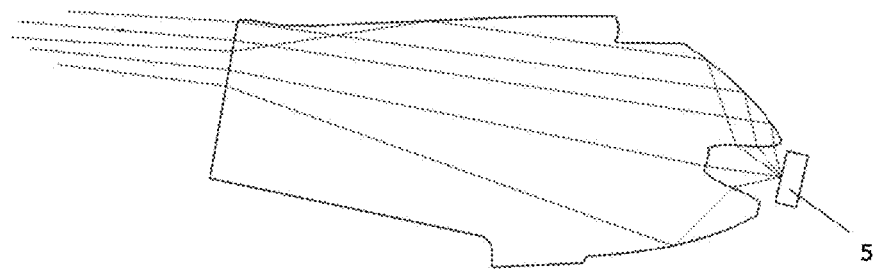
FIG. 8 is a schematic diagram of the light path of emergent light from a light source according to the first embodiment of the present disclosure.

As shown in FIGS. 1-10, a condenser according to the present disclosure comprises: at least one light incident portion 1, a light passage portion 2, and a light emergent portion 3, wherein a 50L dark area light shape forming structure 41 is formed on the light passage portion 2; the 50L dark area light shape forming structure 41 protrudes from a surface of the light passage portion 2 and has a slope surface 411; and the distance from the slope surface 411 to the surface of the light passage portion 2 gradually increases from a position close to the light incident portion 1 to a position close to the light emergent portion 3, such that the 50L dark area light shape forming structure 41 is relatively gentle with respect to the surface of the light passage portion 2 and is closer to the light passage portion 2, such that light emitted by a high beam light source 5 can reach the 50L dark area light shape forming structure 41 and emerge from the front surface, namely the light emergent surface 412, of the 50L dark area light shape forming structure 41 to a 50L test point G. As shown in FIG. 8, in a high beam illumination mode, most light emitted by the high beam light source 5 firstly is converged by the light incident portion 1, then is transmitted via the light passage portion 2 to the light emergent portion 3, and emerge from the light emergent portion 3 to form a high beam light shape as shown in FIG. 11, while the other small part of light is converged by the light incident portion 1 and then transmitted via the light passage portion 2 to the 50L dark area light shape forming structure 41, and emerge from the light emergent surface 412 of the 50L dark area light shape forming structure 41 to the 50L test point G, such that light reaching the 50L test point G is increased, the isophotes here have uniform transition, and no dark spots would be generated.

Specifically, the slope surface 411 and the surface of the light passage portion 2 where the slope surface is located form an included angle α, wherein $0°<α≤30°$, preferably, $0°<α≤10°$, that is to say, the slope surface 411 is a gentle slope surface, and the gentle slope surface 411 makes the entire structure of the 50L dark area light shape forming structure 41 relatively gentle with respect to the surface of the light passage portion 2 and not abrupt, such that in the high beam illumination mode, when the light emitted by the high beam light source 5 can irradiate the inside of the 50L dark area light shape forming structure 41 and finally be projected to the 50L test point G, the illuminance at the 50L test point G is the same as or similar to the high beam light shape illuminance, that is to say, there will neither be dark spots nor too bright at 50L test point G.

Figure 2:
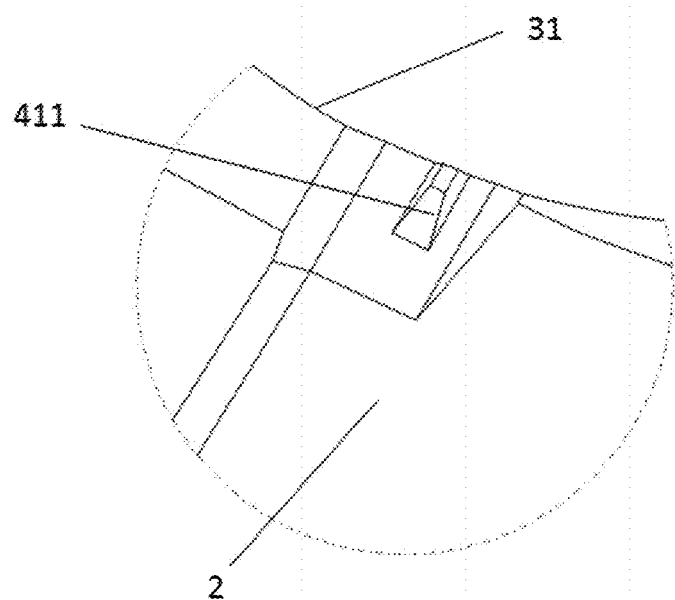
FIG. 2 is an enlarged schematic diagram of part A in FIG. 1.
Figure 3:
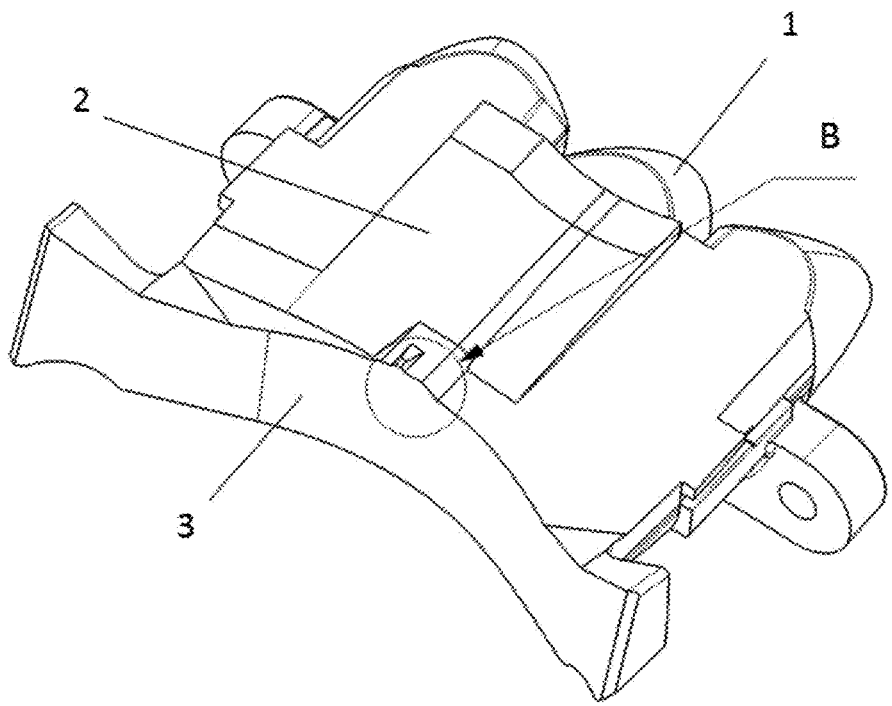
FIG. 3 is a schematic diagram of FIG. 1 seen from another direction.
Figure 4:
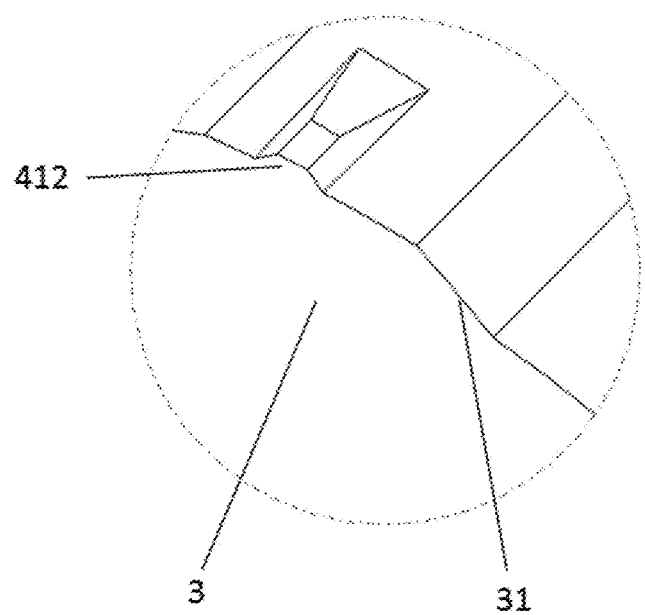
FIG. 4 is an enlarged schematic diagram of part B in FIG. 3.
Figure 5:
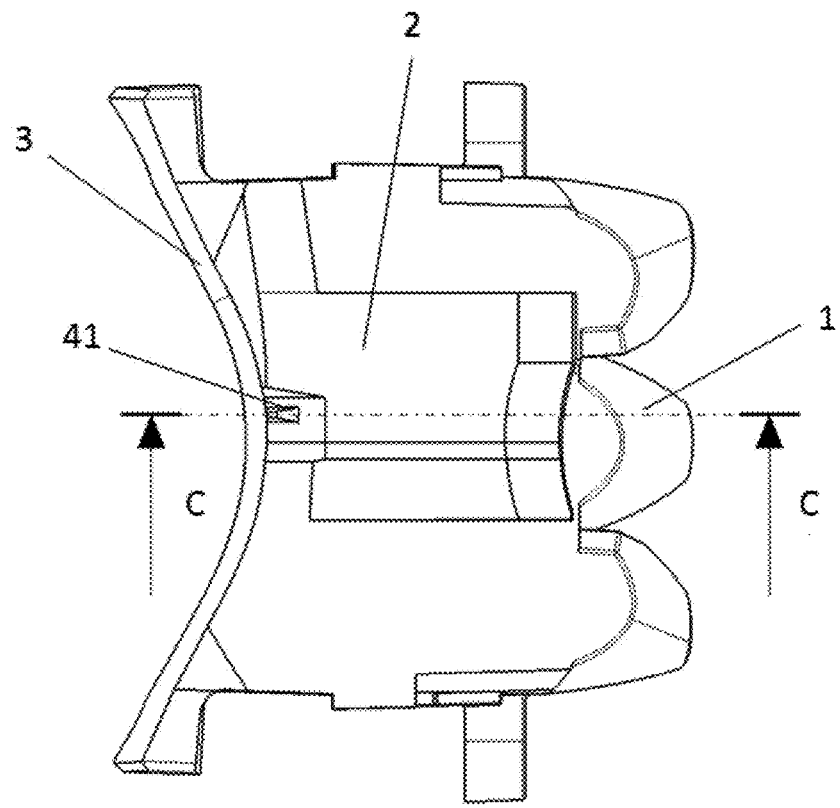
FIG. 5 is a second structural schematic diagram of the first embodiment of the present disclosure.
Figure 6:
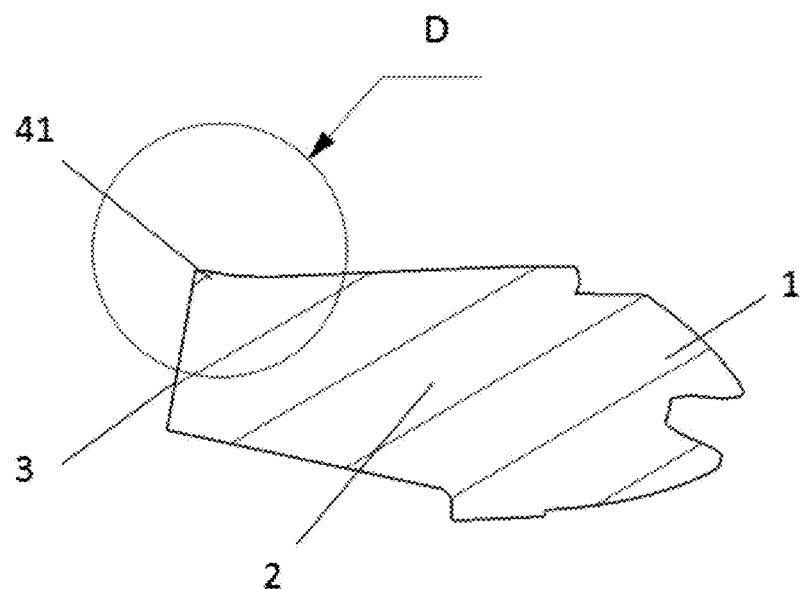
FIG. 6 is sectional view of FIG. 5 in direction C-C.
Figure 7:
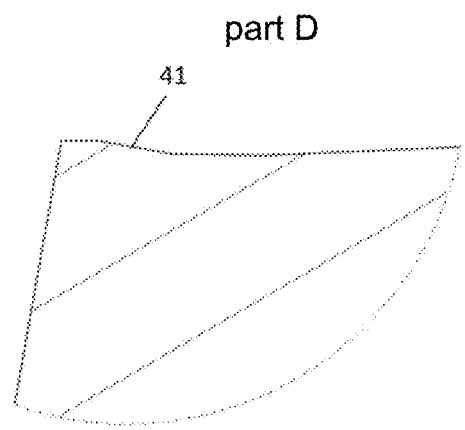
FIG. 7 is an enlarged schematic diagram of part D in FIG. 6.
Figure 10:
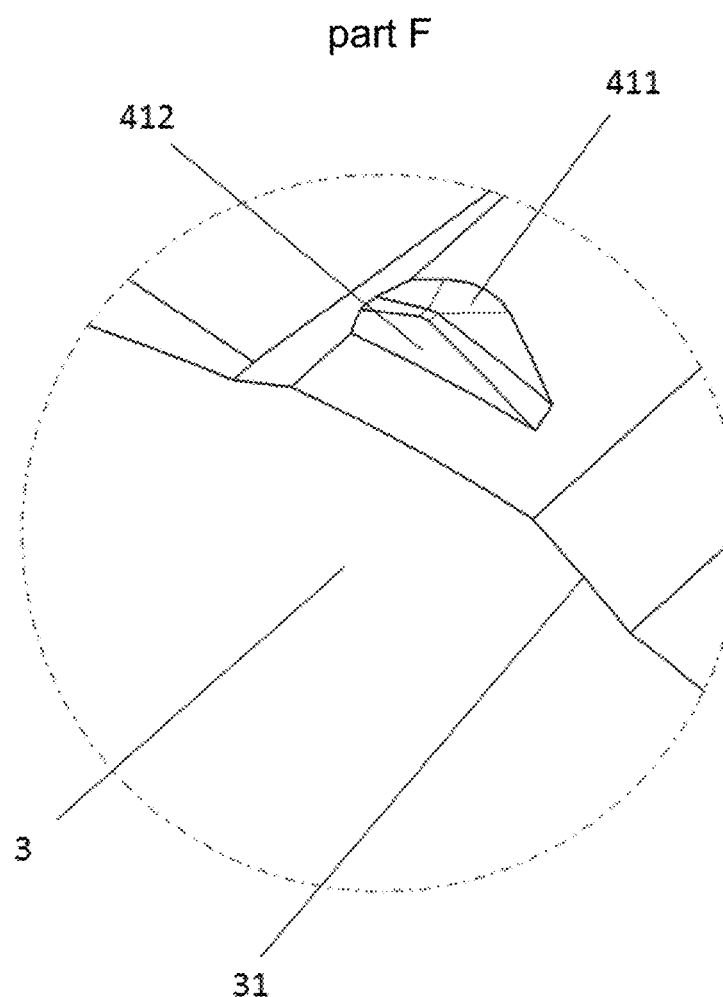
FIG. 10 is an enlarged schematic diagram of part F in FIG. 9.
Figure 11:
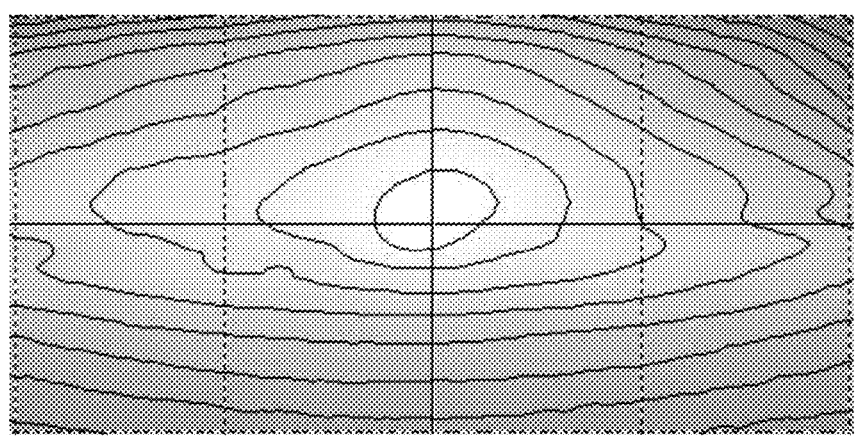
FIG. 11 is a drawing of high beam light shape formed by the projection of a high-and-low-beam integrated vehicle lamp module according to the present disclosure.

On the basis of the above technical solutions, the slope surface 411 may be a flat surface as shown in FIGS. 2 and 4 or a smooth curved surface as shown in FIG. 10, wherein the smooth curved surface can replace the slope surface 411 as shown in FIG. 4 and two inclined surfaces on both sides of the slope surface, and surround the 50L dark area light shape forming structure 41 in a larger range, so that more high beam light can reach the smooth curved surface and the reflection direction of partial light is changed, such that more light emerges from the light emergent surface 412 of the 50L dark area light shape forming structure 41 to the 50L test point G, which results in the increase of light irradiating the 50L test point G and accordingly results in greater brightness at the 50L test point G in the high beam illumination mode, hereby further avoiding the generation of dark spots.

Figure 17:
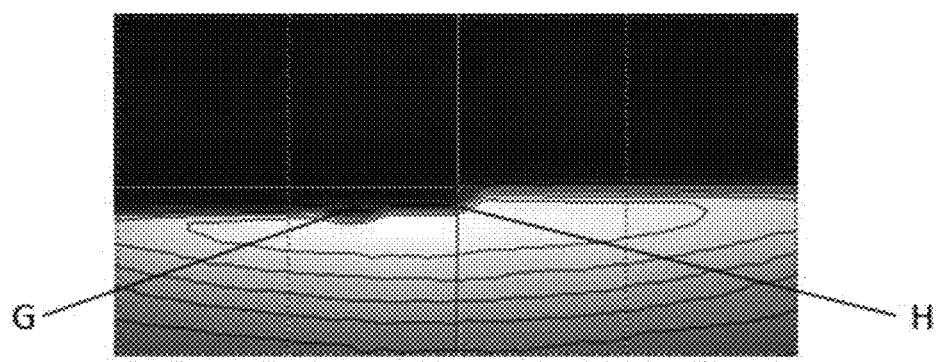
FIG. 17 is a drawing of low beam light shape of a high-and-low-beam integrated vehicle lamp module in the prior art.
Figure 18:
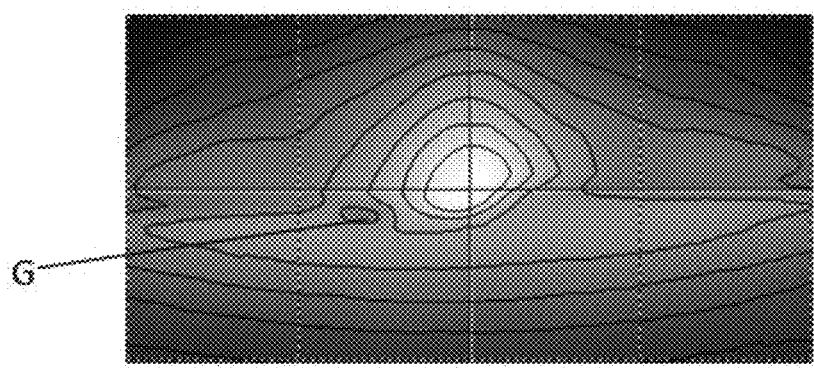
FIG. 18 is a drawing of high beam light shape of a high-and-low-beam integrated vehicle lamp module in the prior art.

An edge of the light emergent portion 3 forms a cut-off line forming structure 31, which correspondingly forms a low beam cut-off line H in the low beam light shape, wherein the low beam cut-off line H in the low beam light shape is clearly visible. An edge line of the light emergent surface 412 of the 50L dark area light shape forming structure 41 may be or may not be in connection with an edge line of the cut-off line forming structure 31. As shown in FIG. 4, in a situation where the edge line of the light emergent surface 412 of the 50L dark area light shape forming structure 41 is in connection with the edge line of the cut-off line forming structure 31, low beam light can be cut off in the low beam illumination mode by the edge line of the light emergent surface 412 of the 50L dark area light shape forming structure 41 and the edge line of the cut-off line forming structure 31 together. As shown in FIG. 17, almost no light reaches the 50L test point G, such that the edge line at the 50L test point G is connected with the low beam cut-off line as a whole, which accordingly greatly reduces the illuminance at the 50L test point G, hereby avoiding a dazzling effect for drivers of oncoming vehicles. The light emergent surface 412 of the 50L dark area light shape forming structure 41 is preferably coplanar with the light emergent portion 3. In this way, the illuminance reduction at the 50L test point G in the low beam illumination mode can be made to be more significant.

As shown in FIG. 10, in a situation where the edge line of the light emergent surface 412 of the 50L dark area light shape forming structure 41 is not in connection with the edge of the cut-off line forming structure 31, that is to say, the 50L dark area light shape forming structure 41 is provided on the side of the cut-off line forming structure 31 close to the light incident portion 1, the illuminance at the 50L test point G would not reduce significantly in the low beam illumination mode, the illuminance reduction is more moderate, and compared with the structure shown in FIG. 4, the low beam light shape uniformity is improved. Meanwhile, in the high beam illumination mode, partial high beam light emerges from the light emergent surface 412 of the 50L dark area light shape forming structure 41 to the 50L test point G, at which there are no dark spots or dark spost are not obvious.

Figure 12:
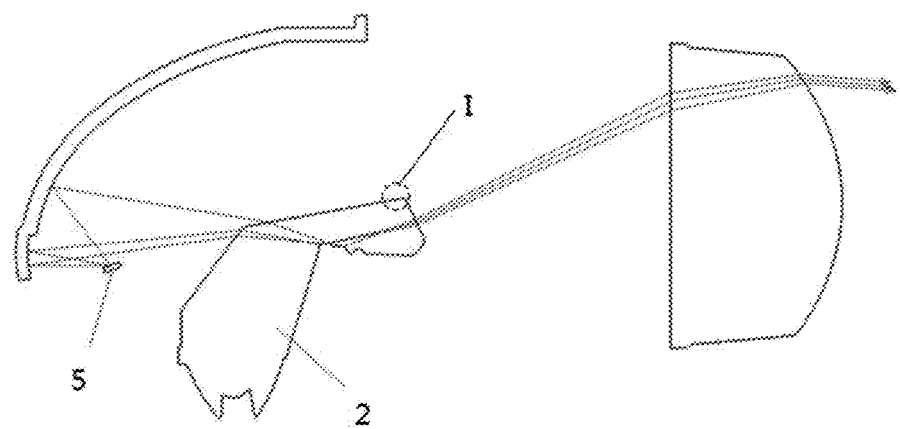
FIG. 12 is a schematic diagram of a third embodiment of the present disclosure.
Figure 13:
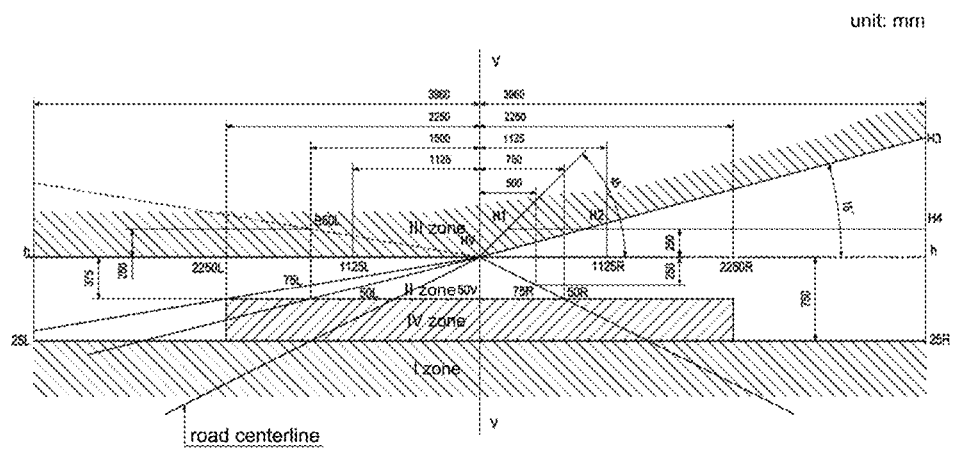
FIG. 13 is a schematic diagram of respective test points and zones for low beam.
Figure 14:
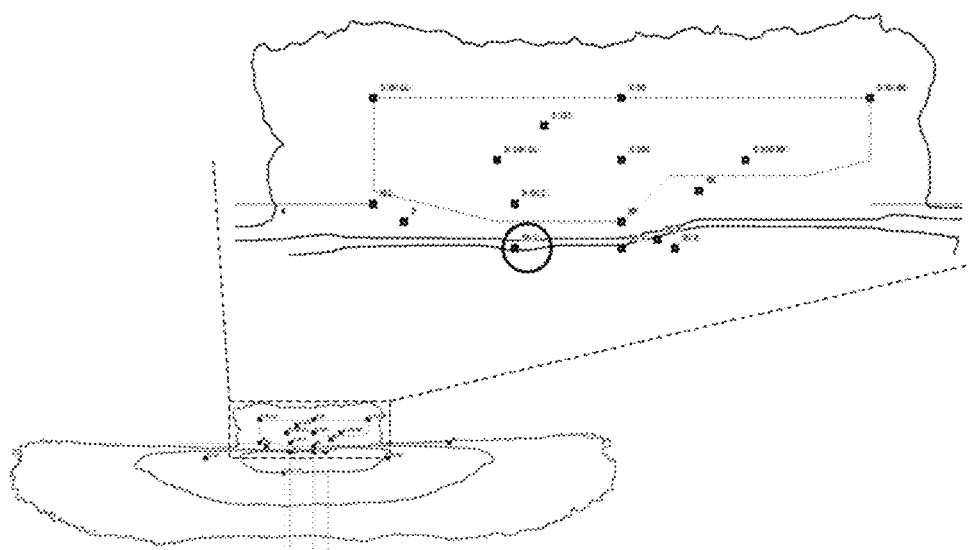
FIG. 14 is a drawing of low beam light shape with partial test points marked out.
Figure 15:
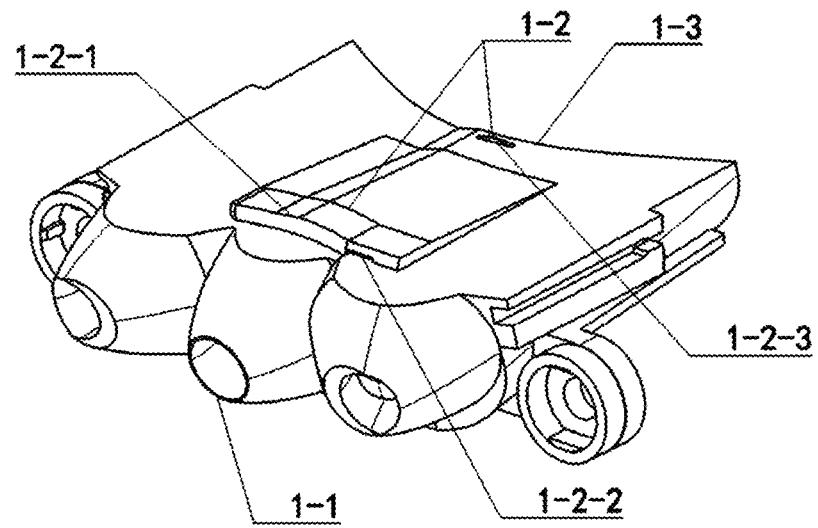
FIG. 15 is a structural schematic diagram of a condenser in the prior art.
Figure 16:
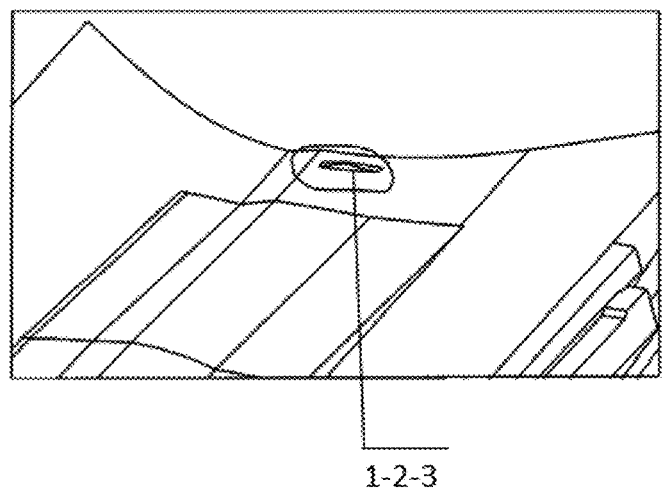
FIG. 16 is an enlarged schematic diagram of a 50L dark area forming structure in the prior art.

In some embodiments of the present disclosure, the 50L dark area light shape forming structure 41 is not only suitable for a high beam condenser extending along one direction as shown in FIGS. 1, 3, 5, 8, and 9, but is also suitable for a high beam condenser bent into an "L"-shape as a whole as shown in FIG. 12, which is provided at a position as shown at part I in FIG. 12, wherein the structural features thereof are consistent with the preceding one, and no repetitive description will be made here.

The present disclosure further provides a high-and-low-beam integrated vehicle lamp module, which comprises a condenser as described above, and further comprises a low beam optical element, a high beam optical element, and a lens provided in front of the low beam optical element and the high beam optical element. A high beam light shape formed by the projection of the high-and-low-beam integrated vehicle lamp module is shown in FIG. 11, and it can be seen from FIG. 11 that there are no dark spots at the 50L test point G and the high beam light shape is uniform. Thus, the present disclosure has a significant effect in improving the 50L dark area light shape forming structure 41 in the condenser.

The low beam optical element of the high-and-low-beam integrated vehicle lamp module of the present disclosure may be a reflection mirror or a condenser.

Two preferred embodiments of the condenser according to the present disclosure are described below.

Embodiment 1

As shown in FIGS. 1-8, the condenser comprises at least one light incident portion 1, a light passage portion 2, and a light emergent portion 3, wherein a 50L dark area light shape forming structure 41 is formed on the light passage portion 2; the 50L dark area light shape forming structure 41 protrudes from a surface of the light passage portion 2 and has a slope surface 411; the slope surface 411 is a flat surface, and the slope surface 411 and the surface of the light passage portion 2 where the slope surface is located form an included angle α, wherein $0°<α≤10°$, and the light emergent surface 412 of the 50L dark area light shape forming structure 41 is coplanar with the light emergent portion 3.

Embodiment 2

Figure 9:
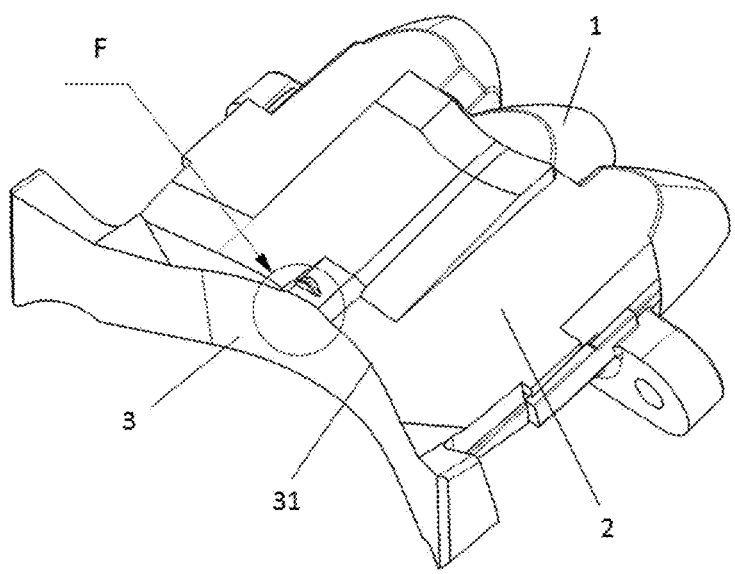
FIG. 9 is a structural schematic diagram of a second embodiment of the present disclosure.

As shown in FIGS. 9 and 10, the condenser comprises at least one light incident portion 1, a light passage portion 2, and a light emergent portion 3, wherein a 50L dark area light shape forming structure 41 is formed on the light passage portion 2; the 50L dark area light shape forming structure 41 protrudes from a surface of the light passage portion 2 and has a slope surface 411; the slope surface 411 is a smooth curved surface, and the slope surface 411 and the surface of the light passage portion 2 where the slope surface is located form an included angle α, wherein 0°<α≤30°, and the light emergent surface 412 of the 50L dark area light shape forming structure 41 is located at the rear the light emergent portion 3.

It can be seen from the preceding description that the present disclosure has following advantages: In the present disclosure, the 50L dark area light shape forming structure 41 is made to protrude from the surface of the light passage portion 2 and have the slope surface 411, such that the 50L dark area light shape forming structure 41 is relatively gentle with respect to the surface of the light passage portion 2 and is closer to the light passage portion 2. In the high beam illumination mode, most light emitted by the high beam light source 5 firstly is converged by the light incident portion 1, then is transmitted via the light passage portion 2 to the light emergent portion 3, and emerge from the light emergent portion 3 to form a high beam light shape, while the other small part of the light is converged by the light incident portion 1 and then transmitted via the light passage portion 2 to the 50L dark area light shape forming structure 41, and emerge from the light emergent surface 412 of the 50L dark area light shape forming structure 41 to the 50L test point G, such that the light reaching the 50L test point G is increased, the isophotes here have uniform transition, no dark spots would be generated, and the uniformity of the high beam light shape is improved. In a preferred solution of the present disclosure, the slope surface 411 and the surface of the light passage portion 2 where the slope surface is located form an included angle ranging from 0 to 30°, and the gentle slope makes the entire structure of the 50L dark area light shape forming structure 41 relatively gentle with respect to the surface of the light passage portion 2 and not abrupt, such that the light emitted by the high beam light source 5 can irradiate the inside of the 50L dark area light shape forming structure 41 and finally be projected to the 50L test point G, such that in the high beam illumination mode, the illuminance at the 50L test point G is the same as or similar to the high beam light shape illuminance.

Preferred embodiments of the present disclosure are illustrated in detail above with reference to the accompanying drawings. However, the present disclosure is not limited to the specific details in the foregoing embodiments, various simple modifications may be made to the technical solutions of the present disclosure within the scope of the technical concept of the present disclosure, and all these simple modifications fall within the scope of protection of the present disclosure.

Moreover, it shall be clarified that various specific technical features described in the above specific embodiments can be combined in any proper manner without causing any conflict, and in order to avoid unnecessary repetition, various possible combination manners will not be described here in the present disclosure.

In addition, various embodiments of the present disclosure may also be combined arbitrarily, and as long as they do not violate the spirit of the present disclosure, they should also be deemed as contents disclosed in the present disclosure.

The invention claimed is:

1. A condenser, comprising at least one light incident portion, a light passage portion, and a light emergent portion, wherein a 50L dark area light shape forming structure is formed on the light passage portion; the 50L dark area light shape forming structure protrudes from a surface of the light passage portion and has a slope surface, and the 50L dark area light shape forming structure further has a top surface, a bottom surface, and two side surfaces on the side of the slope surface, wherein the top surface and the bottom surface are two substantially parallel planes; and a distance from the slope surface to the surface of the light passage portion gradually increases from a position close to the light incident portion to a position close to the light emergent portion, wherein an edge of the light emergent portion forms a cut-off line forming structure, and an edge line of the light emergent surface of the 50L dark area light shape forming structure is in connection with an edge line of the cut-off line forming structure; and wherein the slope surface and a surface of the light passage portion where the slope surface is located form an included angle α, wherein 0°<α≤10°.

2. The condenser according to claim 1, wherein the light emergent surface of the 50L dark area light shape forming structure is coplanar with the light emergent portion.

3. The condenser according to claim 1, wherein an edge of the light emergent portion forms a cut-off line forming structure, and the 50L dark area light shape forming structure is provided on a side of the cut-off line forming structure close to the light incident portion.

4. A high-and-low-beam integrated vehicle lamp module, comprising the condenser according to claim 1.

5. The condenser according to claim 1, wherein the slope surface is a flat surface or a smooth curved surface.

* * * * *